(12) United States Patent
Yeh et al.

(10) Patent No.: US 9,436,075 B2
(45) Date of Patent: Sep. 6, 2016

(54) IMAGING DEVICE AND MOUNTING APPARATUS

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Chin-Wen Yeh, New Taipei (TW); Dun-Jun Zhou, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 84 days.

(21) Appl. No.: 14/568,875

(22) Filed: Dec. 12, 2014

(65) Prior Publication Data
US 2016/0124294 A1    May 5, 2016

(30) Foreign Application Priority Data
Nov. 4, 2014   (CN) .......................... 2014 1 0611481

(51) Int. Cl.
| G03B 21/14 | (2006.01) |
| G03B 21/28 | (2006.01) |
| G02B 7/02 | (2006.01) |
| G03B 21/20 | (2006.01) |
| F21V 8/00 | (2006.01) |
| F21V 7/00 | (2006.01) |

(52) U.S. Cl.
CPC ............. *G03B 21/28* (2013.01); *F21V 7/0091* (2013.01); *G02B 6/0096* (2013.01); *G02B 7/02* (2013.01); *G03B 21/208* (2013.01)

(58) Field of Classification Search
CPC .. G02B 6/009; G02B 6/0011; G02B 6/0086; G02B 6/0093; F21V 7/0091; G03B 21/14; G03B 21/16; G03B 21/28; G03B 21/208
See application file for complete search history.

(56) References Cited

U.S. PATENT DOCUMENTS

| 6,773,118 | B2 * | 8/2004 | Lee | G02B 6/0006 353/122 |
| 7,004,586 | B2 * | 2/2006 | Morinaga | G03B 21/145 349/58 |
| 7,883,218 | B2 * | 2/2011 | Yoshikawa | G03B 21/16 353/122 |
| 2009/0262315 | A1 * | 10/2009 | Tseng | G03B 21/208 353/119 |
| 2013/0057788 | A1 * | 3/2013 | Hsiung | G02B 6/0008 349/9 |
| 2016/0109786 | A1 * | 4/2016 | Yeh | G03B 21/2093 353/101 |

* cited by examiner

*Primary Examiner* — William C Dowling
(74) *Attorney, Agent, or Firm* — Zhigang Ma

(57) ABSTRACT

An imaging device includes a lens, a light pipe, a cover, and a mounting base. The cover can be coupled to the mounting base. The cover defines a groove and includes a latching plate and a mounting plate. The latching plate and the mounting plate are located at two opposite sides of the groove. The mounting plate defines a mounting hole. The mounting base defines a slot, a limiting slot corresponding to the latching plate, and a plurality of securing holes. When the imaging device is assembled, the latching plate is engaged in the limiting slot, a fastener is inserted into the mounting hole and engaged in the corresponding securing hole. The lens and the light pipe are received in the slot and the groove.

20 Claims, 3 Drawing Sheets

IMAGING DEVICE AND MOUNTING APPARATUS

CROSS-REFERENCE TO RELATED APPLICATIONS

This application claims priority to Chinese Patent Application No. 201410611481.X filed on Nov. 4, 2014, the contents of which are hereby incorporated by reference.

FIELD

The subject matter herein generally relates to an imaging device, and more particularly to a mounting apparatus for an imaging device for mounting a light pipe and a lens.

BACKGROUND

An imaging device, such as projector, usually includes a light pipe and a lens aligned with the light pipe. The image device further includes a mounting base and a cover, the light pipe and the lens are located between the mounting base and the cover.

BRIEF DESCRIPTION OF THE DRAWINGS

Implementations of the present technology will now be described, by way of example only, with reference to the attached figures.

DETAILED DESCRIPTION

Figure 1:
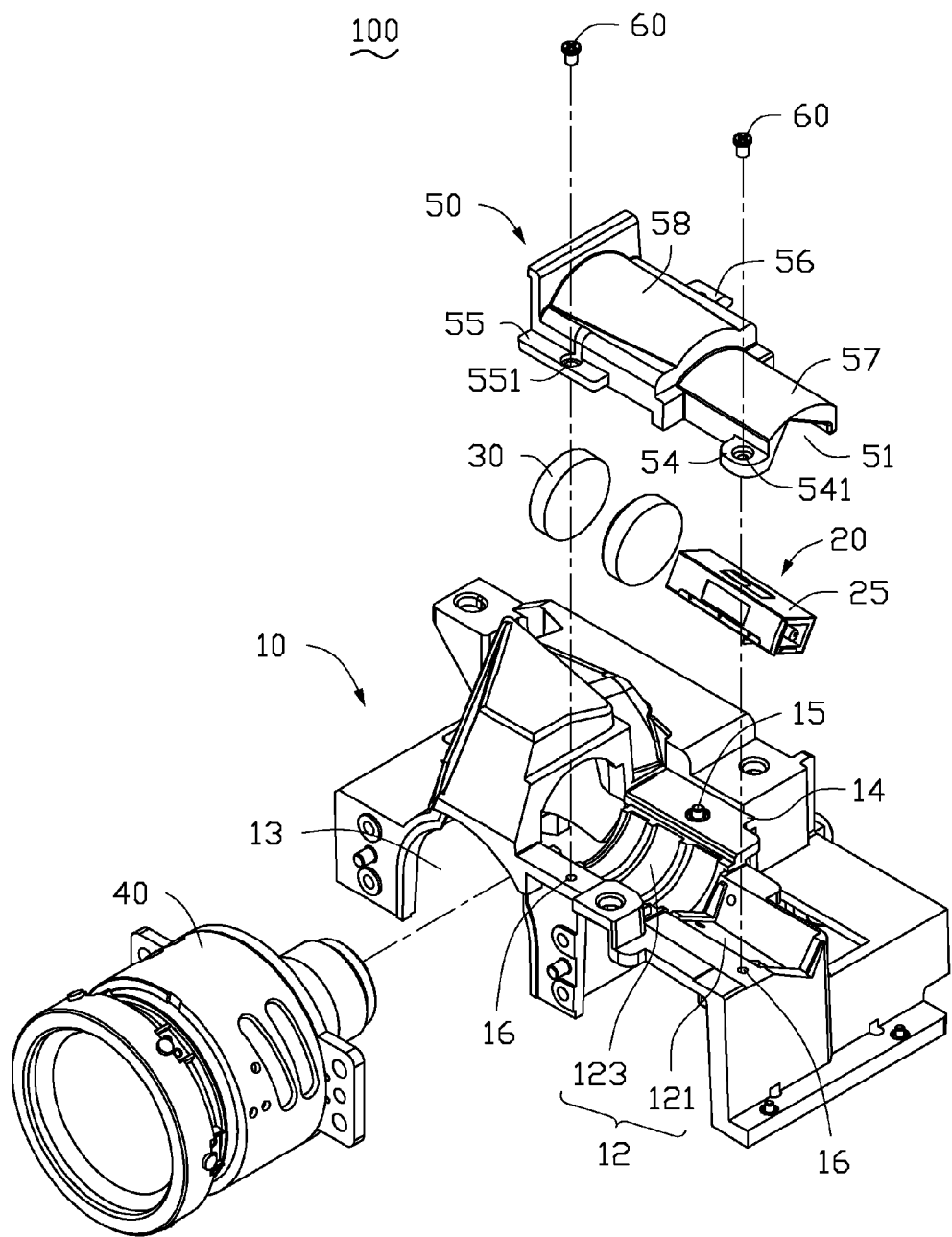
FIG. 1 is an isometric, exploded view of an imaging device in accordance with an embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

FIG. 1 illustrates an imaging device 100 including a mounting base 10, a light pipe 20, at least one lens 30, a projection lens 40, and a cover 50. The cover 50 can be coupled to the mounting base 10. In at least one embodiment, the imaging device 100 is a projector.

A slot 12 and an opening 13 are defined in the mounting base 10. A first extension direction of the slot 12 is substantially perpendicular to a second extension direction of the opening 13. The slot 12 includes a first slot 121 and a second slot 123 communicating the first slot 121. The first slot 121 is configured to receive the light pipe 20, and the second slot 123 is configured to receive the lens 30. In at least one embodiment, a cross section of the first slot 121 is substantially V-shaped, and a cross section of the second slot 123 is substantially semi-circular.

A limiting slot 14 is defined in the mounting base 10 adjacent to the slot 12. A cross section of the limiting slot 14 can be substantially wedge-shaped. A guiding post 15 extends from the mounting base 10. The guiding post 15 is located between the second slot 123 and the limiting slot 14. A plurality of securing holes 16 are defined in the mounting base 10. In at least one embodiment, the securing holes 16 and the guiding post 15 are located at two opposite sides of the slot 12.

The light pipe 20 includes four reflectors 25 connected in turn. The cover 50 defines a groove 51 corresponding to the slot 12. The cover 50 includes a fixing plate 54, a mounting plate 55, and a latching plate 56. The fixing plate 54 and the mounting plate 55 are located at the same side of the groove 51. The mounting plate 55 and the latching plate 56 are located at two opposite sides of the groove 51. The fixing plate 54 defines a fixing hole 541. The mounting plate 55 defines a mounting hole 551. The cover 50 further includes a first cover 57 to cover the light pipe 20 and a second cover 58 to cover the lens 30. The first cover 57 is integrated with the second cover 58. The fixing plate 54 is attached to the first cover 57. The mounting plate 55 and the latching plate 56 are attached to the second cover 58.

Figure 2:
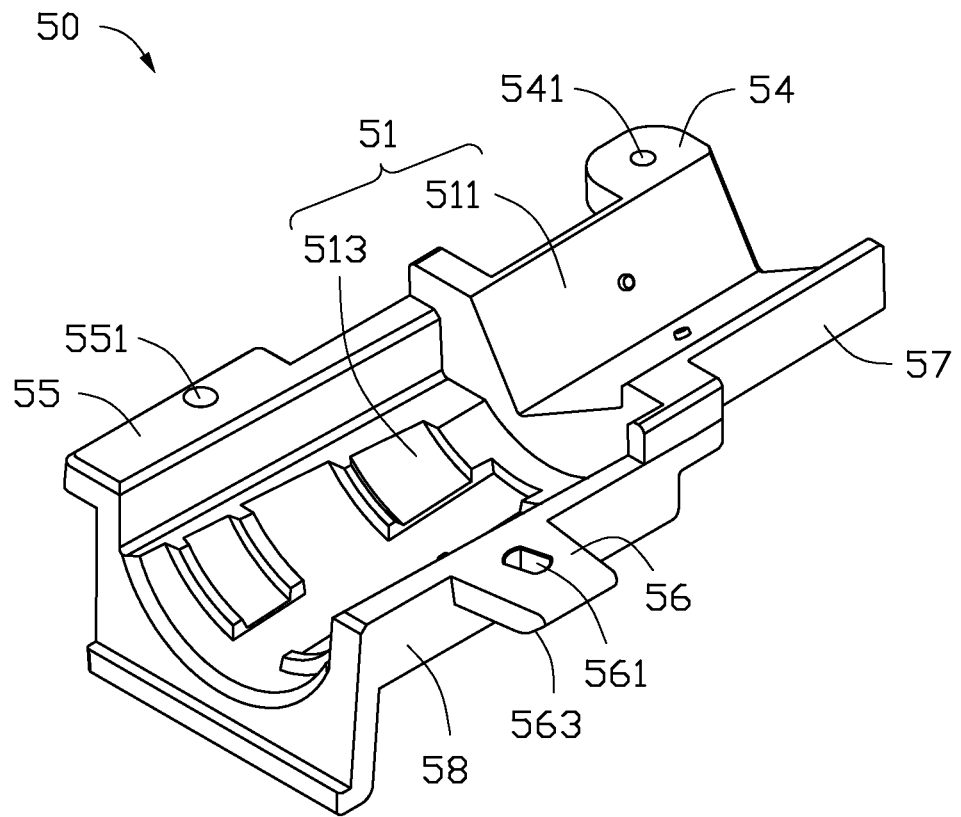
FIG. 2 is an isometric view of a cover of FIG. 1.

FIG. 2 illustrates the groove 51 includes a first groove 511 and a second groove 513 communicating with the first groove 511. The first groove 511 is defined in the first cover 57 and configured to receive the light pipe 20, and a second groove 513 is defined in the second cover 58 and configured to receive the lens 30. In at least one embodiment, a cross section of the first groove 511 is substantially V-shaped, and a cross section of the second groove 513 is substantially semi-circular. The latching plate 56 defines a guiding slot 561 corresponding to the guiding post 15. The latching plate 56 includes an inclined plane 563. The inclined plane 563 is located at a free end of the latching plate 56. The inclined plane 563 is configured to guide the latching plate 56 to engage in the limiting slot 14.

Figure 3:
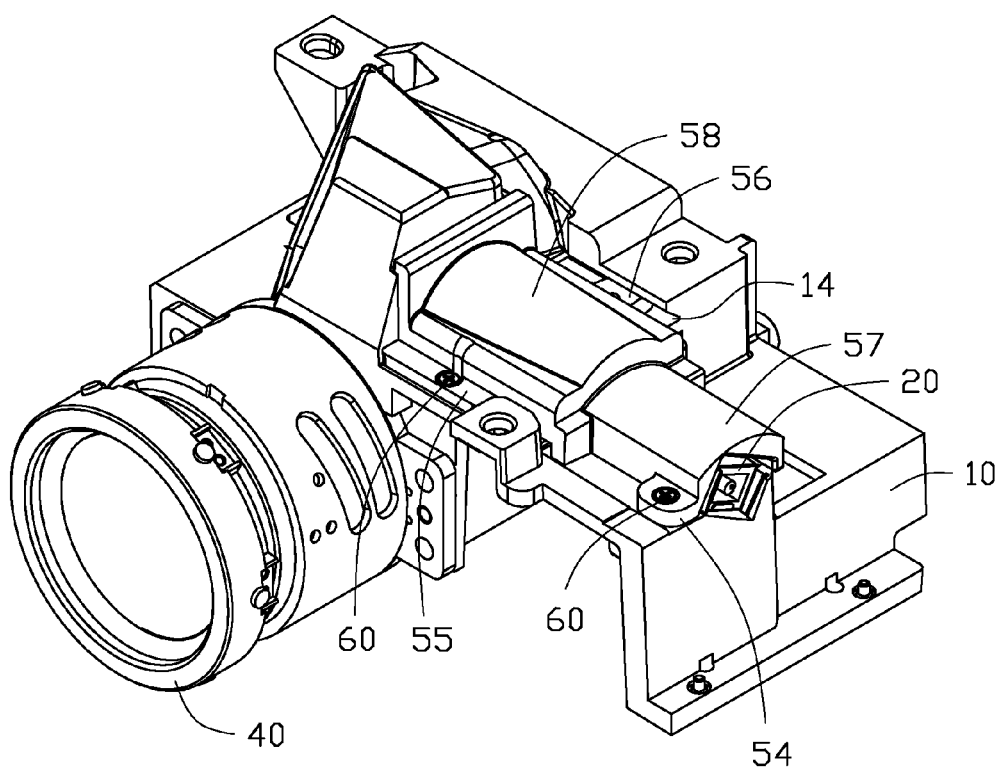
FIG. 3 is an assembled view of the imaging device of FIG. 1.

FIG. 3 illustrates an assembly of the imaging device 100. When the imaging device 100 is assembled, the projection lens 40 is fixed in the opening 13, and the light pipe 20 and the lens 30 are put in the slot 12. The light pipe 20 is received in the first slot 121, and the lens 30 is received in the second slot 123. The cover 50 can be moved towards the mounting base 10, and the groove 51 faces the slot 12. One guiding post 15 is engaged in the guiding slot 561. The cover 50 is pushed to move towards the limiting slot 14 till the latching plate 56 is engaged in the limiting slot 14. The inclined plane 563 abuts against a sidewall of the limiting slot 14. The mounting hole 551 is aligned with one securing hole 16, and the fixing hole is aligned with one securing hole 16. One fastener 60 is inserted into the mounting hole 551 and engaged in the corresponding securing hole 16, and one fastener 60 is inserted into the fixing hole 541 and engaged in the corresponding securing hole 16. The imaging device 100 is assembled. The light pipe 20 is corporately received in the first slot 121 and the first groove 511. The lens 30 is corporately received in the second slot 123 and the second groove 513. The light pipe 20 and the lens 30 are located between the mounting base 10 and the cover 50. A beam of light can shine in the light pipe 20, and reflected into the lens 30 by the reflector 25, and projected onto a screen via the projection lens 40, thereby forming an image on the screen. When the latching plate 56 is engaged in the limiting slot 14, the mounting hole 551 and the fixing hole 541 are aligned with the corresponding securing hole 16. It is convenient to assemble the imaging device 100.

The embodiments shown and described above are only examples. Many details are often found in the art such as the other features of a mounting apparatus. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An imaging device comprising:
   a lens;
   a light pipe;
   a cover defining a groove and comprising a latching plate and a mounting plate, the latching plate and the mounting plate being located at two opposite sides of the groove, the mounting plate defining a mounting hole; and
   a mounting base defining a slot, a limiting slot, and a securing hole;
   wherein a limiting plate is engaged in the limiting slot, a fastener is mounted in the mounting hole and securing hole, the lens and the light pipe are received in the slot and groove.

2. The imaging device of claim 1, wherein an inclined plane is located at a free end of the latching plate.

3. The imaging device of claim 2, wherein a cross section of the limiting slot is substantially wedge-shaped, the inclined plane abuts against a sidewall of the limiting slot.

4. The imaging device of claim 1, wherein the slot comprises a first slot and a second slot communicating the first slot, the groove comprises a first groove and a second groove communicating the first groove, the light pipe is received in the first slot and the first groove, and the lens is received in the second slot and the second groove.

5. The imaging device of claim 4, wherein a guiding post extends from the mounting base, the latching plate defines a guiding hole, the guiding post is slidably engaged in the guiding hole.

6. The imaging device of claim 5, wherein the guiding post is located between the limiting slot and the second slot.

7. The imaging device of claim 4, wherein the cover comprises a first cover and a second cover integrated with the first cover, the first groove is defined in the first cover, and the second groove is defined in the second cover.

8. The imaging device of claim 7, wherein the mounting plate and the latching plate are attached to the first cover.

9. The imaging device of claim 7, wherein the cover comprises a fixing plate attached to the first cover, a fixing hole is defined in the fixing plate.

10. The imaging device of claim 1, further comprising a projection lens, wherein the mounting base defines an opening, a first extension direction of the slot is substantially perpendicular to a second extension direction of the opening.

11. A mounting apparatus for mounting a lens and a light pipe comprising:
    a mounting base defining a slot, a limiting slot, and a plurality of securing holes; and
    a cover defining a groove, comprising a latching plate and a mounting plate, the latching plate and the mounting plate being located at two opposite sides of the groove;
    wherein the groove and the slot are configured to receive a lens and a light pipe of an imaging device, the latching plate is engaged in the limiting slot, a fastener is configured to be mounted in a mounting hole and the plurality of securing holes.

12. The mounting apparatus of claim 11, wherein an inclined plane is located at a free end of the latching plate.

13. The mounting apparatus of claim 12, wherein a cross section of the limiting slot is substantially wedge-shaped, the inclined plane abuts against a sidewall of the limiting slot.

14. The mounting apparatus of claim 11, wherein the slot comprises a first slot and a second slot communicating the first slot, the groove comprises a first groove and a second groove communicating the first groove, the first slot and the first groove are configured to receive the light pipe, and the second slot and the second groove are configured to receive the lens.

15. The mounting apparatus of claim 14, wherein a guiding post extends from the mounting base, the latching plate defines a guiding hole, the guiding post is slidably engaged in the guiding hole.

16. The mounting apparatus of claim 15, wherein the guiding post is located between the limiting slot and the second slot.

17. The mounting apparatus of claim 14, wherein the cover comprises a first cover and a second cover integrated with the first cover, the first groove defined in the first cover, and the second groove is defined in the second cover.

18. The mounting apparatus of claim 17, wherein the mounting plate and the latching plate are attached to the first cover.

19. The mounting apparatus of claim 17, wherein the cover comprises a fixing plate attached to the first cover, a fixing hole is defined in the fixing plate.

20. The mounting apparatus of claim 11, wherein the mounting base defines an opening to receive a projection lens, a first extension direction of the slot is substantially perpendicular to a second extension direction of the opening.

* * * * *